US012657600B2

(12) United States Patent
Herkey et al.

(10) Patent No.: US 12,657,600 B2
(45) Date of Patent: Jun. 16, 2026

(54) DYNAMIC UPGRADE ENGINE

(71) Applicant: Truist Bank, Charlotte, NC (US)

(72) Inventors: Todd Donald Herkey, Cornelius, NC (US); Brian James Savarese, Suwanee, GA (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 18/647,278

(22) Filed: Apr. 26, 2024

(65) Prior Publication Data

US 2025/0335951 A1     Oct. 30, 2025

(51) Int. Cl.
*G06Q 30/02*     (2023.01)
*G06Q 30/0207*    (2023.01)
*G06Q 40/02*     (2023.01)

(52) U.S. Cl.
CPC ......... *G06Q 30/0215* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 8,504,470 B1 * | 8/2013 | Chirehdast ............. | G06Q 40/02 705/38 |
| 10,636,085 B1 * | 4/2020 | Lovett ................... | G06F 3/0482 |
| 2009/0063332 A1 * | 3/2009 | Tabaczynski .......... | G06Q 30/02 705/39 |
| 2019/0087865 A1 * | 3/2019 | Loree ................ | G06Q 30/0269 |

* cited by examiner

*Primary Examiner* — Dipen M Patel
(74) *Attorney, Agent, or Firm* — Michael A. Springs, Esq.; Shumaker, Loop & Kendrick, LLP; Patrick B. Horne

(57)     ABSTRACT
A system architecture for offering an upgraded deposit interest rate to certain clients using a method which is easy for the financial institution to implement and convenient for the clients to accept. A deposit rate promotion system is built in a configurable programming environment. The deposit rate promotion system serves as a hub between other existing bank systems—including back-end systems which control client and account information, and client-facing systems in the form of digital banking systems and employee-operated branch office systems. A bank employee implements a new deposit rate promotional campaign in the system by defining criteria for eligible clients and other parameters. Eligible clients need only perform the qualifying action, such as opening a new account of the prescribed type, in order to receive the promotional deposit rate. The system architecture includes adapters and interfaces required for both real-time and batch data transfer between all affected bank systems.

9 Claims, 8 Drawing Sheets

710

700

720

DYNAMIC UPGRADE ENGINE

FIELD

The present disclosure relates generally to the field of digital banking data systems, and more particularly to a workflow process and system architecture for enabling a financial institution to offer an upgraded deposit interest rate to certain clients in a manner which is easier for the financial institution to implement than with legacy systems and processes, and is more convenient for the clients to activate than with conventional promotional programs.

BACKGROUND

Banks and other financial institutions typically have many computerized data systems, often including old and highly specialized "legacy systems" which securely manage critical data such as account deposit balances but are inflexible and difficult to update to accommodate new business practices.

In addition, digital banking systems are well known and used by many banks and their customers. Two common types of digital banking systems are online web-based systems which interact with a user (e.g., client) via a web browser window on a computer, and mobile applications ("apps") which run on mobile devices such as smart phones and tablets. Both online web-based banking systems and mobile banking apps communicate with back-end servers which manage account data, validate and execute specific transactions, provide data for display, etc. Both web-based and mobile app-based systems also include security and customer authentication features, where user-provided information and/or biometric information is collected from the customer and validated with data stored on the back-end servers.

Many bank clients prefer to do virtually all of their banking using the online banking systems described above-including opening accounts, paying bills, moving money between accounts, etc. However, some clients still prefer to perform these banking functions by visiting branch offices. Some clients do some of their banking online, and visit a branch office for other banking activity. Thus, bank businesses must offer systems and services allowing most functions to be performed in both online banking systems and in bank branch office systems.

Like most businesses, the banking industry is very competitive, and banks must continuously compete for new clients and must also work diligently to maintain the satisfaction of existing clients. As a result, sales/marketing and management employees in a bank business often wish to run promotional campaigns which offer certain incentives to new clients, existing clients or both. One such type of incentive is an upgraded interest rate on savings balances. However, given the fixed and inflexible architecture of legacy banking systems, the only way to extend the upgraded interest rate to a select group of clients is to send a promotional offer (e.g., email) to the clients and require the clients to produce a promotional code in order to redeem the offer.

In light of the circumstances described above, there is a need for a banking system which enables bank managers to easily and dynamically apply a promotional offer such as an upgraded interest rate to a select group of clients such that the clients automatically receive the upgrade when performing a qualifying transaction, whether in an online banking system or by visiting a branch office.

BRIEF SUMMARY

The present disclosure describes a system architecture for enabling a financial institution to offer an upgraded deposit interest rate to certain clients in a manner which is easy for the financial institution to implement and convenient for the clients to accept. A deposit rate promotion system is built in a configurable programming environment. The deposit rate promotion system serves as a hub between several other existing bank systems-including back-end legacy systems which control client and account information, and client-facing systems both in the form of digital banking systems and employee-operated branch office systems. An authorized bank manager implements a new deposit rate promotional campaign in the system by defining criteria for eligible clients and other parameters. Eligible clients need only perform the qualifying action, such as opening a new account of the prescribed type, in order to receive the promotional deposit rate. The system architecture includes all adapters and interfaces required for both real-time and batch data transfer between all affected bank systems.

The features, functions, and advantages that have been discussed may be achieved independently in various embodiments of the present disclosure or may be combined in yet other embodiments, further details of which can be seen with reference to the following description and drawings, along with the appended claims.

DETAILED DESCRIPTION OF EMBODIMENTS

Figure 1:
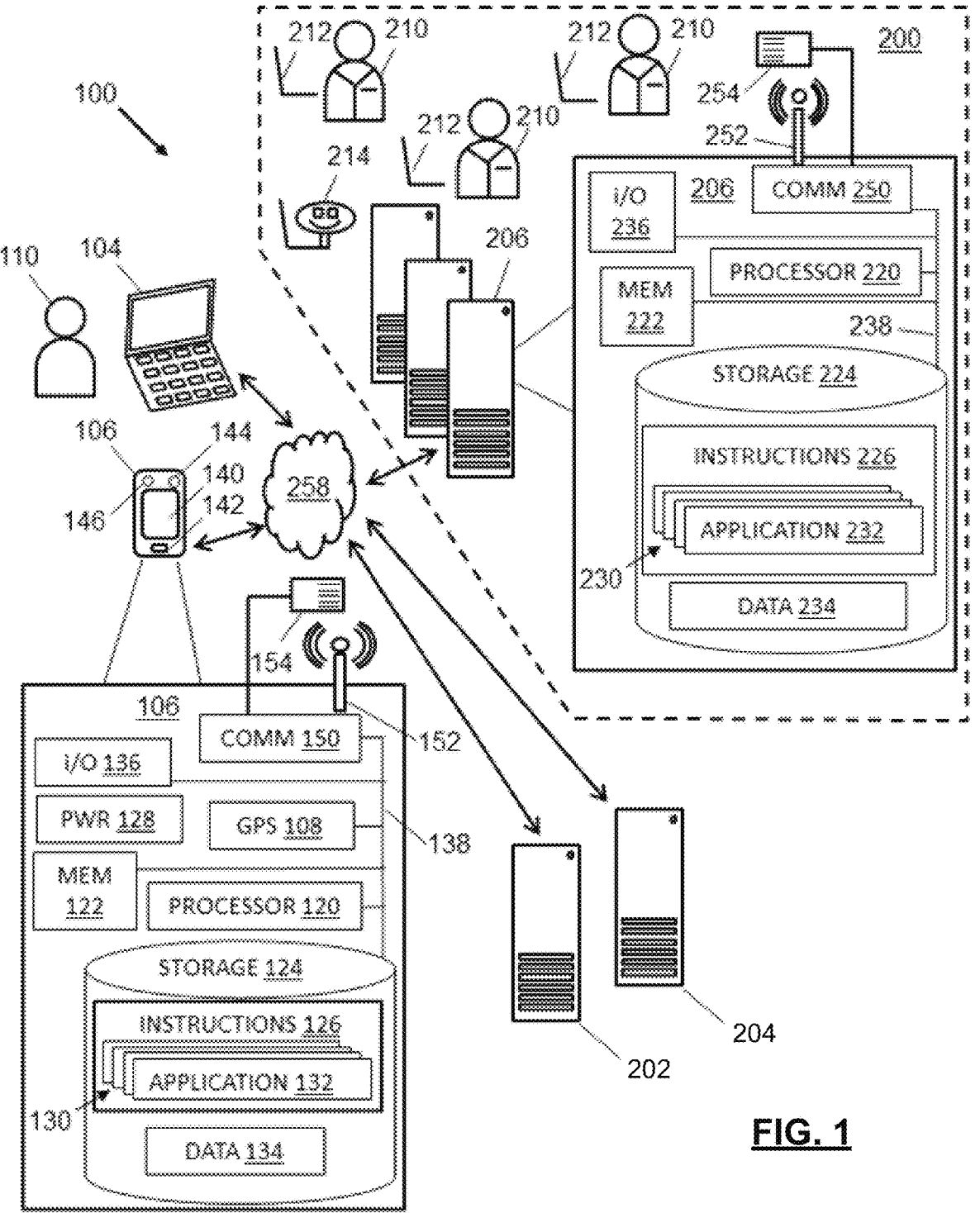
FIG. 1 illustrates an enterprise system, and environment thereof, including a centralized server system, distributed computers and mobile devices, and communication therebetween, according to at least one embodiment of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, including centralized and distributed computing devices, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing.

Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/ b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

Figure 2:
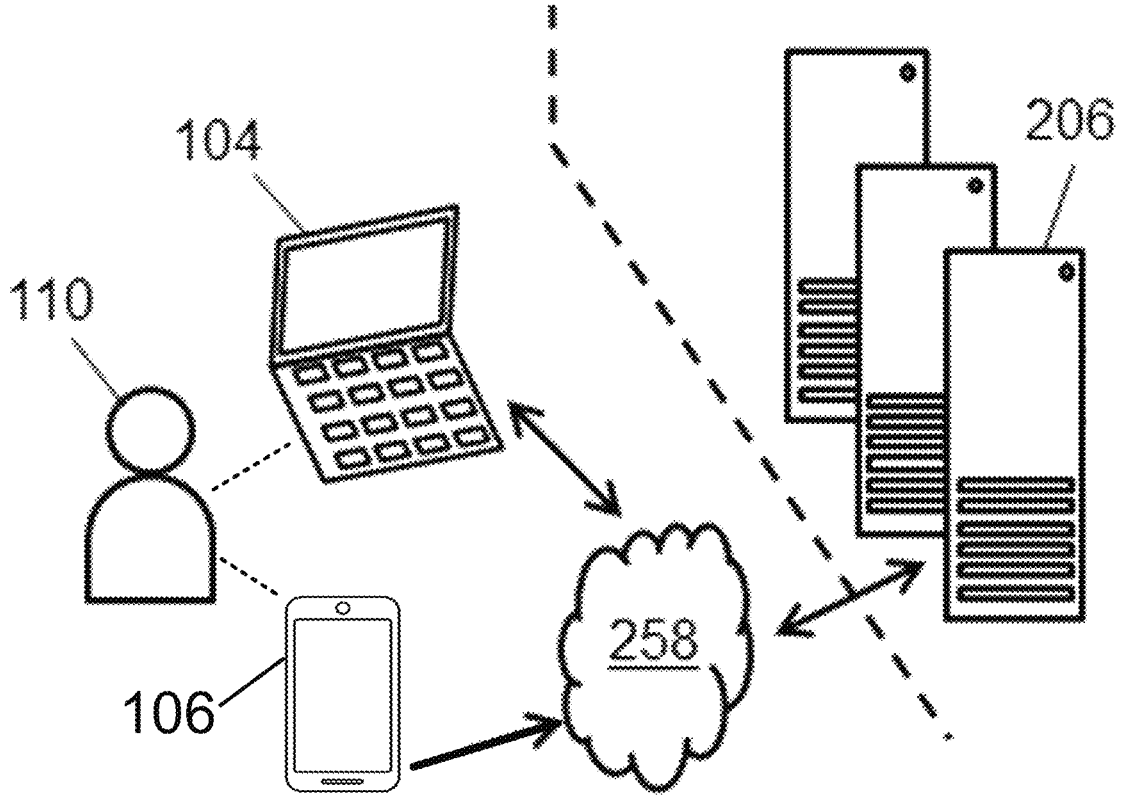
FIG. 2 is a simplified illustration of the enterprise system of FIG. 1, showing the elements most directly involved in online and digital banking systems used in the communication and implementation of an upgraded deposit interest rate as embodied in the techniques of the present disclosure.

FIG. 2 is a simplified illustration of the enterprise architecture depicted in FIG. 1, showing the elements most directly involved in using online/digital banking systems. The user 110 (e.g., a client) uses either the computing device 104 or the mobile device 106 to access a digital banking system, where the computing device 104 would run a web browser application in which the digital banking system is displayed, and the mobile device 106 would run a mobile application ("app") specifically designed as the digital banking system. The computing device 104 and/or the mobile device 106 communicate with the computing system (back-end servers) 206 via the network ("the cloud") 258.

Banking customers have at least one account, and often more than one account, with a bank business. These accounts may include savings accounts, checking accounts, investment accounts, credit cards, loans, mortgages, etc. Online/digital banking systems are now widely used because they enable clients to conveniently perform most banking functions electronically-including opening accounts, transferring money between accounts, paying bills, viewing transaction details, etc. The use of online/digital banking systems as related to the techniques of the present disclosure will be illustrated in later figures and described in the discussion accompanying those figures.

Having described an enterprise computing environment as might be used by a banking business, and general characteristics of systems including online and digital banking systems which may be employed in the enterprise computing environment, attention is now turned to the specific topic of the present disclosure-a system architecture for enabling a financial institution to offer an upgraded deposit interest rate to certain clients.

As has been discussed above, bank businesses operate many different types of computer systems and databases-including the online and digital banking systems discussed immediately above, along with systems used and bank branch offices, and older "legacy" systems which manage vital information such as customer account data. In spite of—or perhaps because of—this variety of computer systems, it is not a simple matter for a bank to roll out a promotional offer such as an upgraded interest rate on new savings to a certain group of clients. At best, it would be possible to identify the target clients in some manner and send an email or a paper mail offer of the promotional interest rate, requiring the client to produce a "promo code" at a branch office in order to receive the promotional offer.

The techniques of the present disclosure describe a system architecture developed to enable a financial institution to offer an upgraded deposit interest rate to certain clients in a manner which is easier for the financial institution to implement than with existing legacy systems and processes, and is more convenient for the clients to accept and activate than with conventional promotional programs. This system architecture and the underlying design elements, along with examples of how the system is used for offering and accepting the upgraded deposit interest rate, are depicted in the remaining figures and discussed below.

Figure 3:
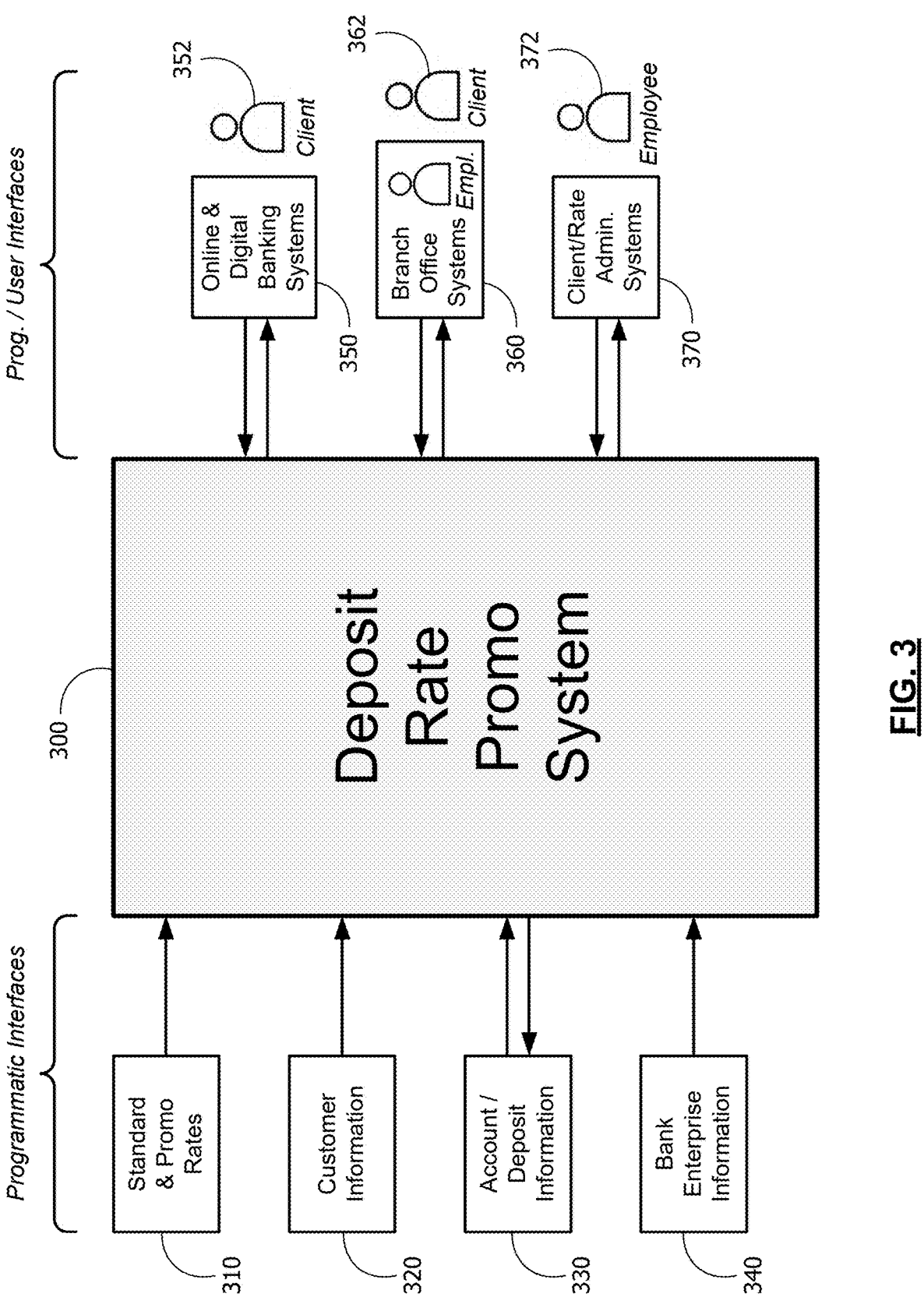
FIG. 3 is an illustration of a system architecture for a deposit rate promotion system, or dynamic upgrade engine, depicting programmatic interfaces to several existing systems, including both data transfer to back-office systems and real-time interaction with systems performing user interface functions, according to an embodiment of the present disclosure.

FIG. 3 is an illustration of a system architecture for a deposit rate promotion system 300, or dynamic upgrade engine, depicting programmatic interfaces to several existing systems, including both data transfer to back-office systems and real-time interaction with systems performing user interface functions, according to an embodiment of the present disclosure. The deposit rate promotion system 300 is designed to interface with many other bank systems; this is depicted conceptually in FIG. 3. In addition to retrieving and in some cases modifying data from the other systems, the deposit rate promotion system 300 also provides user interface and database features needed to enable a fully functioning system architecture.

On the left side of FIG. 3 are several existing bank systems which have programmatic interfaces with the deposit rate promotion system 300. These programmatic interfaces may include "batch"-type data uploads (e.g., hourly, or nightly), or real-time interactive calls to read or write data, or both. These systems are discussed further below, in connection with both FIGS. 3 and 4.

A rate information system 310 provides standard and promotional interest rates for client deposits, among other things. The system 310 may in turn receive information from external sources about benchmarks such as the prime rate and/or the Federal Reserve's overnight lending rate, and use these benchmark rates to determine the bank's own interest rates for client deposits. As a simple example, a standard (un-upgraded) savings interest rate for clients might be 2.0% (annually), and based on that the bank may offer a first level upgraded rate of 2.25%, a second level upgraded rate of 2.50% and a premium level upgraded rate of 2.75%. These rates, in this scenario, are managed by the rate information system 310, and are provided to and used by the deposit rate promotion system 300 as discussed later.

A customer information system 320 provides customer information such as client demographics and banking relationships. This may include contact information, mailing addresses, relationships to other bank clients including business relationships and affiliations, etc.

An account and deposit information system 330 provides account and deposit information, including account identifiers, account interest rates and account balances. In typical embodiments, the account and deposit information system 330 processes account level transactions (credits, debits, charges), performs interest calculations and payments, manages regulatory information, and performs other vital banking functions. FIG. 3 shows a two-way arrow interface between the account and deposit information system 330 and the deposit rate promotion system 300. This is because the deposit rate promotion system 300 both reads account and deposit data from the system 330 and may also write data to the system 330—such as opening a new deposit account and applying the upgraded interest rate to the new account according to the features of the deposit rate promotion system 300.

A bank enterprise information system 340 provides other needed bank information, not included in the systems discussed above, such as cost centers, branch information, cross-references between system data tables and elements, and so forth. Other data elements may be housed in the enterprise information system 340 or its equivalent, as would be understood by those knowledgeable of banking systems.

On the right side of FIG. 3 are bank systems which have programmatic interfaces with the deposit rate promotion system 300 and also provide a user interface to clients or bank employees. These system interfaces are characterized by real-time interactions between the systems to read and/or write data. Examples of user interface screens and the features provided thereon are discussed with respect to later figures.

Online/digital banking systems 350 provide web-based and mobile app-based access to many banking functions, as discussed earlier. A client 352 interacts directly with the online/digital banking systems 350 via a computer or a mobile device. Because of the popularity of online and digital banking systems, it is imperative that the deposit rate promotion system 300 interoperates with these systems to allow clients to receive offers of promotional deposit savings rates and act as necessary to take advantage of the offer.

Branch office systems 360 are used by bank branch employees to perform banking functions on behalf of a client 362. The branch office systems 360 enable the same types of functions as discussed earlier with respect to online/digital banking systems (open accounts, transfer funds between accounts, make payments, etc.)—in addition to others. Any bank customer may be the client 352, the client 362, or both. It is not meant to be implied that an online banking client never goes to a branch office, or vice versa.

Client/rate administration systems 370 represent one or more bank systems which are used by a bank employee 372 to manage the administration of the deposit rate promotion system 300. Some functionality of the client/rate administration systems 370 (e.g., identification of a group of clients based on attributes) may be provided by existing bank systems, and some functionality (e.g., application of promo rates) may be provided by new features of the deposit rate promotion system 300 itself.

It is to be understood that the systems 310-370 depicted in FIG. 3 are merely illustrative of the architecture—and any given implementation of the architecture may include different systems, systems which overlap with or handle data differently than shown in FIG. 3, etc. An exemplary design of a system including the various required interfaces and adapters is discussed below.

Figure 4:
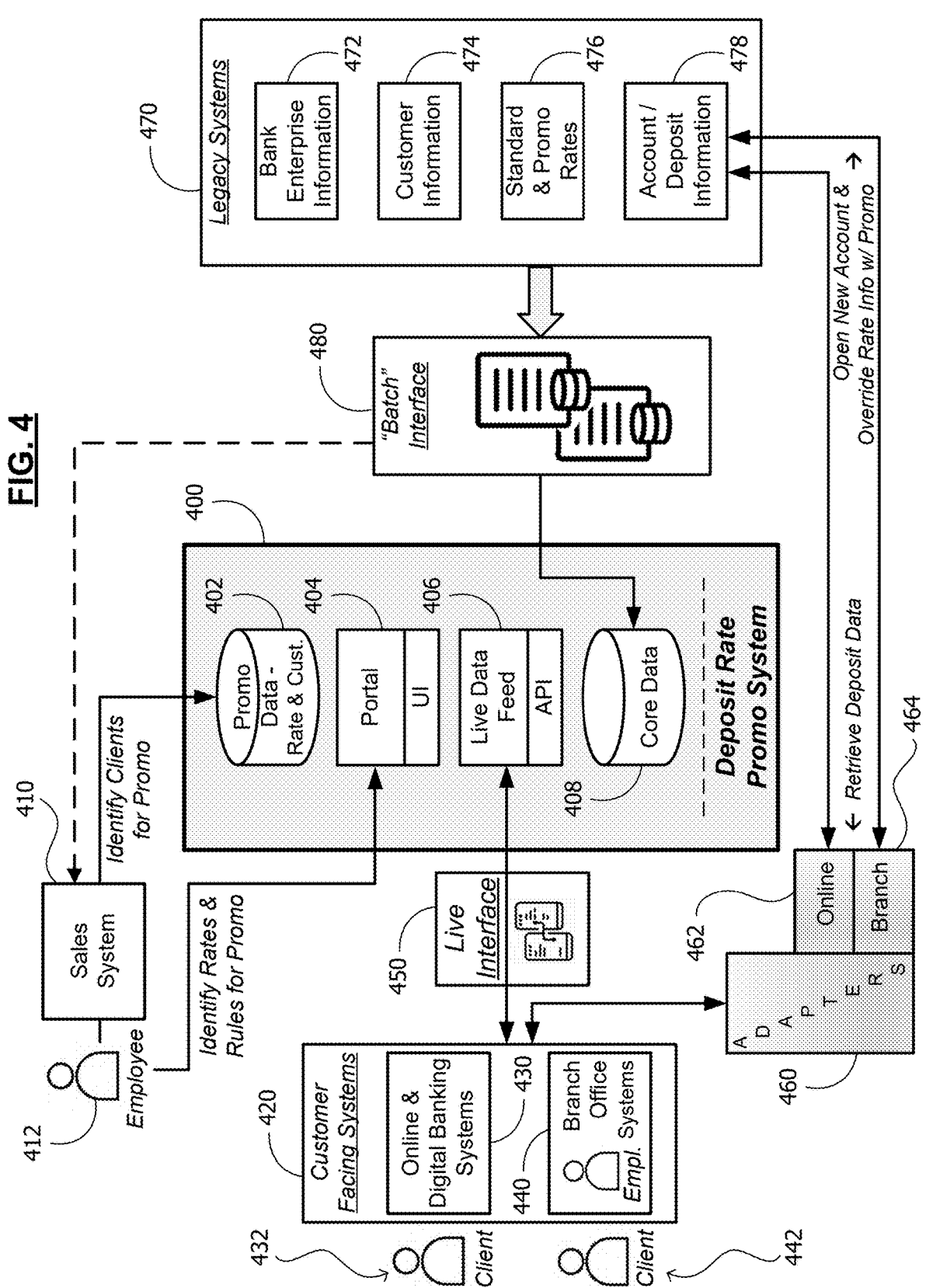
FIG. 4 is a block diagram illustration of a deposit rate promotion system of the type shown in FIG. 3, depicting several existing banking systems and how data moves between the systems to enable dynamically applied promotional offers of upgraded deposit interest rates to select clients, according to an embodiment of the present disclosure.

FIG. 4 is a block diagram illustration of a deposit rate promotion system of the type shown in FIG. 3, depicting several existing banking systems and how data moves between the systems to enable dynamically applied promotional offers of upgraded deposit interest rates to select clients, according to an embodiment of the present disclosure. A deposit rate promotion system 400 is shown in the center of FIG. 4 with its core elements and functions. It is to be understood that some other elements of FIG. 4—such as interfaces and adapters—may be also considered to be part of the deposit rate promotion system 400 in its largest sense.

At the top left of FIG. 4, a sales system 410 is used by a bank employee 412. The employee 412 corresponds with the employee 372 of FIG. 3, and the sales system 410 corresponds with part of the functionality of the client/rate administration systems 370. The employee 412 uses the sales system 410 to identify clients for a promotional deposit rate campaign. For example, if the sales system 410 contains sales-related attribute data for clients—including number of accounts per client, total amount of deposit funds on account per client, how long each client has had accounts at the bank, etc.—then the sales system 410 can be used by the employee 412 to select a batch of clients based on some combination of these attributes. The identified batch of clients is then stored or defined in a database 402 of the deposit rate promotion system 400 as shown. Much of the sales-related attribute data may be housed in other bank systems (discussed below) and provided in a data feed to the sales system 410 where it is available for convenient viewing, sorting and selection.

The employee 412 also interacts with a portal 404 of the deposit rate promotion system 400 to identify rates and rules for a deposit rate promotional campaign. In some embodiments, the deposit rate promotion system 400 is developed in a programming environment with built-in data table definition features and web-based user interface features, where the portal 404 is configured using these user interface features. In one non-limiting example, the employee 412 might identify a batch of clients having three or more accounts at the bank and store that batch in the database 402. The employee 412 would then use the portal 404 to select the appropriate client batch and define and implement a new deposit rate promotional campaign. An example such as this is discussed later with respect to FIG. 5.

Customer-facing systems 420 are shown at the left of FIG. 4. In this design embodiment, the customer-facing systems 420 include online/digital banking systems 430 and branch office systems 440. The online/digital banking systems 430 and branch office systems 440, along with their clients 432 and 442, respectively, correspond with the like-named elements of FIG. 3.

A live interface 450 provides real-time connectivity between the customer-facing systems 420/430/440 and a live data feed 406 of the deposit rate promotion system 400. The live data feed 406 is an application programming interface (API), which is another element of the programming environment in which the deposit rate promotion system 400 is built. The live interface 450 enables the customer-facing systems 420/430/440 to access the promotional savings interest rate for clients as determined by the campaigns created by the bank employee 412.

Adapters 460—including an adapter 462 tailored for the online/digital banking systems 430, and an adapter 464 tailored for the branch office systems 440—provide connectivity to bank legacy systems 470. The use of the customer-facing systems 420/430/440, the live interface 450, and the adapters 460/462/464—in connection with the deposit rate promotion system 400 and the other elements of FIG. 4—are discussed below.

The bank legacy systems 470 at the right of FIG. 4 include a bank enterprise information system 472, a customer information system 474, a rate information system 476, and an account and deposit information system 478. The systems 472-478 correspond with the like-named systems discussed earlier in connection with FIG. 3.

A "batch" interface 480 provides data from the bank legacy systems 470 to a core database 408 of the deposit rate promotion system 400. As discussed earlier, the legacy systems 470 are typically systems which were developed many years ago. Although the legacy systems 470 have proven to be reliable and secure for managing critical bank data, they are generally not designed to be used in a real-time interactive read/write mode of operation, and certainly do not have web-based and app-based user interface functionality. It is therefore necessary to periodically (e.g., hourly, nightly, etc.) export an image of their data and provide that data to the deposit rate promotion system 400. That is the purpose of the batch interface 480. The batch interface 480 may also provide customer and account data to the sales system 410, as indicated by the dashed line in FIG. 4.

The core database 408 of the deposit rate promotion system 400 retains the latest copy of the data from the legacy system 470. As discussed above, the deposit rate promotion campaign data resides in the database 402—as defined by the employee 412 using the sales system 410 and the portal interface 404. All of the data from the databases 402 and 408 is available to the customer-facing systems 420 via the live data feed (API) 406.

An exemplary use case for the deposit rate promotion system 400 is as follows. The employee 412 creates a new deposit rate promotional campaign by selecting a group of clients and designating that those clients are eligible for an upgraded interest rate on a new savings deposit account. The clients in the group receive notification of the promotion-such as by email, push notification in a digital banking systems mobile app, a message in an online banking system, etc. Each interested client then performs the qualifying transaction either by using the online/digital banking systems 430 or by visiting a branch office where an employee uses the branch office systems 440. The eligibility of the client is automatically verified by way of the live interface 450 to the data feed 406 of the deposit rate promotion system 400. No promotion code or other type of redemption qualifier needs to be provided by the client; the client's eligibility is determined automatically based on the client's proof of identity (such as by logging into the digital banking system).

The online/digital banking systems 430 or the branch office systems 440 then creates the new savings deposit in the account and deposit information system 478, using the adapters 460/462/464. This includes opening the account if necessary, depositing money into the account from a designated source of funds, and establishing the savings interest rate for the account as identified in the promotional campaign (overwriting a default interest rate). Other use case scenarios may of course be envisioned, in addition to the one discussed above.

The deposit rate promotion system 400 illustrated in FIG. 4 provides convenience and flexibility features, useful in implementing deposit rate promotional campaigns, which do not existing in existing bank systems. These features include fast and flexible definition of promotional campaign offers by bank managers in order to meet deposit rate administration policies and satisfy marketing strategies, and convenient acceptance of the offers by clients using their choice of digital banking systems or branch office visit. Example use cases are discussed further below.

Figure 5:
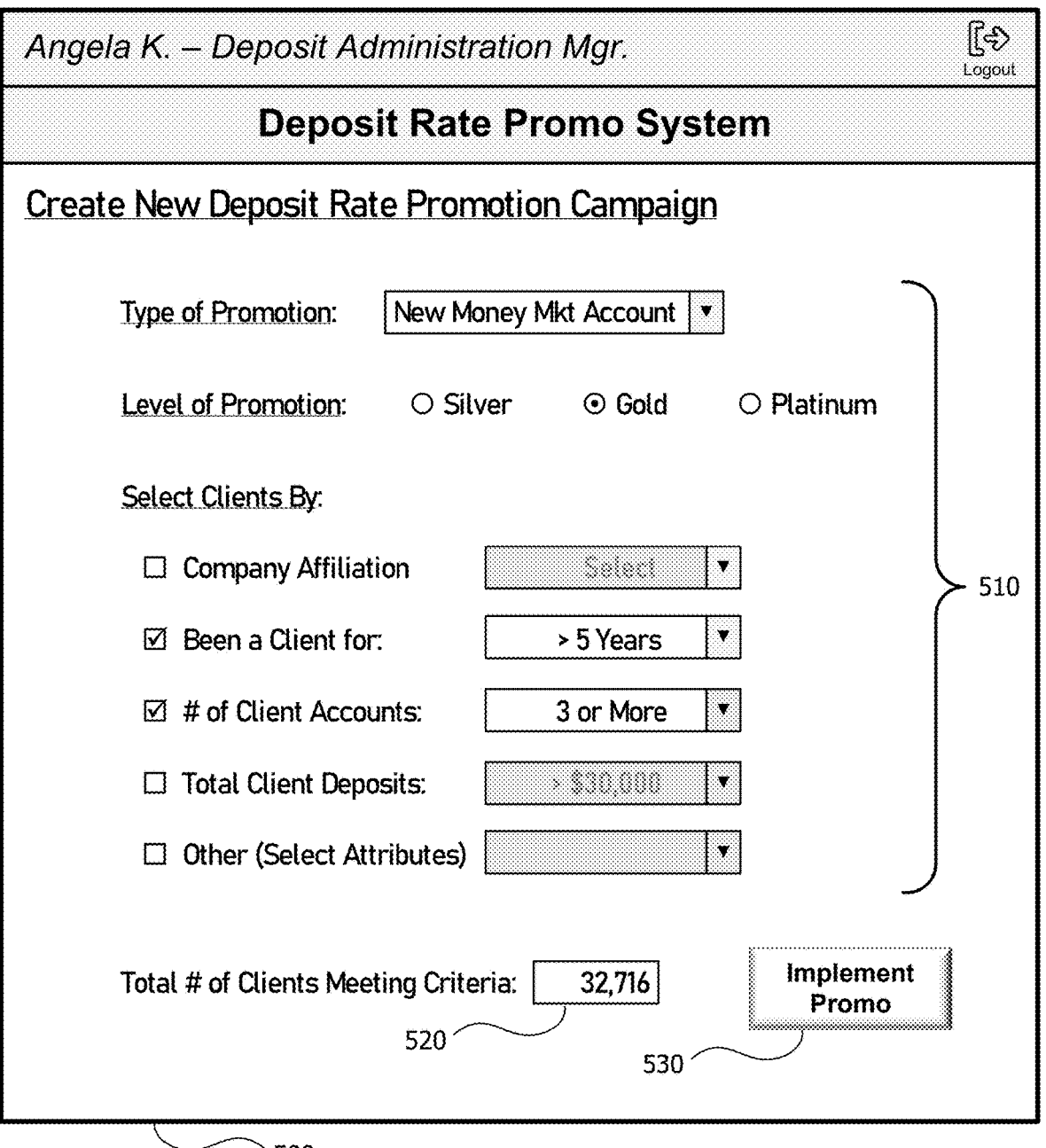
FIG. 5 is a mock-up illustration of a user interface screen of the deposit rate promotion system, on a display screen of a computing device, where an appropriately-authorized bank employee defines parameters and criteria for implementing a new deposit rate promotion campaign, according to an embodiment of the present disclosure.

FIG. 5 is a mock-up illustration of a user interface screen 500 of the deposit rate promotion system, on a display screen of a computing device, where an appropriately-authorized bank employee defines parameters and criteria for implementing a new deposit rate promotion campaign, according to an embodiment of the present disclosure. The user interface screen 500 of FIG. 5 is an example use case of the employee 412 interacting with the portal 404 as illustrated in FIG. 4. The user interface screen 500 of FIG. 5 is depicted as a web page on a computer monitor; other equivalent embodiments may be envisioned as suitable.

A set of parameters and selection criteria for the new deposit rate promotion campaign are shown generally at 510. These are meant to be understood as representing one non-limiting embodiment to illustrate the functionality of the deposit rate promotion system 400. The employee may first define a type of campaign, such as from a drop-list. In this case, the selected campaign is for a promotional interest rate on a new money market account, for selected clients. The employee may then define the level of promotion associated with the present promotion campaign. For example, there may exist three levels of upgraded interest rates-designated here as silver, gold and platinum, and the employee has selected "gold". Because interest rates change regularly, it is convenient to define unchanging upgrade levels in the user interface. The actual corresponding interest rate of each level may also be shown on the user interface screen 500. An earlier example listed a first level upgraded rate of 2.25%, a second level upgraded rate of 2.50% and a premium level upgraded rate of 2.75%; these may correspond with silver, gold and platinum, respectively.

The employee then identifies the criteria by which client eligibility will be determined. In this example, the selectable criteria include a company affiliation (for example, employees of a company which is a client of the bank, where the individual clients' relationship to the employer is defined in the customer information system 474), a length of clients' business with the bank, a number of accounts held by clients, and a total amount of client deposits with the bank. These selection criteria are identified by a combination of checkboxes and droplists, where the checkboxes indicated that more than one criteria may be selected, and the droplists allow the details of the selected criteria to be defined. An "other" checkbox is also shown, where it is possible to select from any client attributes (e.g., geographic region of an address, etc.) which are available in the data from the customer information system 474 or the sales system 410.

FIG. 5 illustrates merely exemplary client selection criteria. Other criteria may be used instead of or in addition to those shown on FIG. 5. This could include selection of clients who have recently experienced a life event-such as a birth or death in the family, a new job or a job promotion, etc. Another example is selecting clients whose account history shows a pattern of increased savings balances at a certain time of year, such as the end of the first quarter. Provisionally-selected client pools may be evaluated to make sure they meet demographic inclusivity requirements. These types of selection criteria may involve advanced analysis algorithms and/or the use of machine learning systems such as neural networks.

Below the parameters and selection criteria 510, a box 520 displays the total number of clients who meet the criteria as currently identified above. It is very likely that the bank employee will want to implement interest rate promotional campaigns which target a defined number of clients, and the box 520 enables the employee to fine-tune the selection criteria as necessary to achieve the desired target number.

A button 530 at the bottom right of the user interface screen 500 is used by the bank employee to implement the promotional campaign when the parameters and criteria are satisfactory. Clicking the button 530 tells the deposit rate promotion system 400 (via the portal 404, which the employee 412 interacts with) that the promotion is active. This may trigger messages and notifications to clients, informational communications to branch office managers, etc.

The use of drop-lists, checkboxes and radio buttons, as illustrated in FIG. 5, is again meant to represent one non-limiting embodiment. Other user interface design options may be envisioned by those skilled in the art. This includes different parameters and criteria, different arrangement of items on the user interface screen 500, and so forth.

Figure 6:
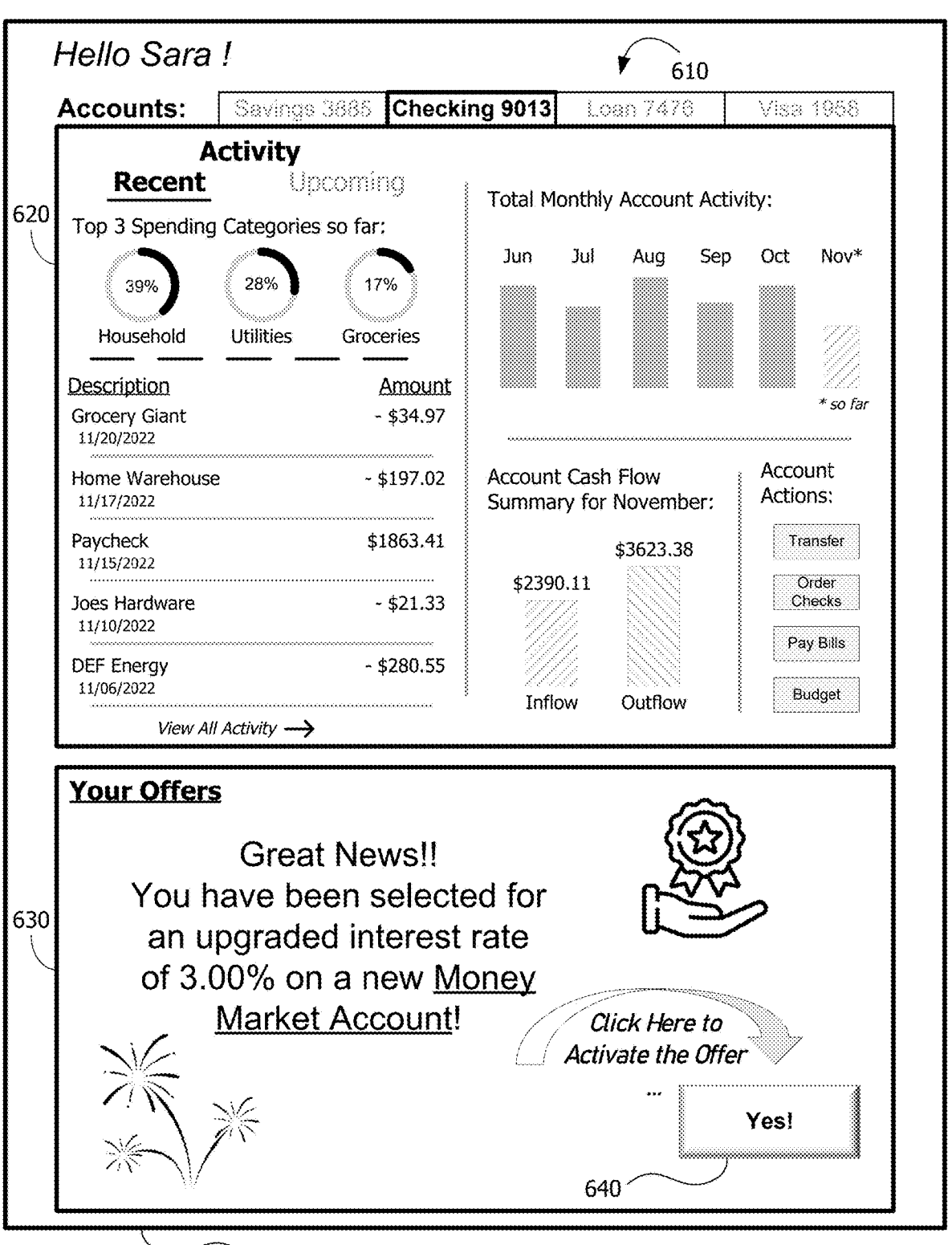
FIG. 6 is a mock-up illustration of an online banking system on a display screen of a computing device, depicting a user dashboard for a client including an account overview along with a new deposit rate promotion campaign offer, according to an embodiment of the present disclosure.

FIG. 6 is a mock-up illustration of an online banking system on a display screen 600 of a computing device, depicting a user dashboard 610 for a client including an account overview section 620 along with a new deposit rate promotion campaign offer 630, according to an embodiment of the present disclosure.

The account overview section 620 depicts a variety of information as would be available to a client in an online banking system. This includes, for each of several accounts held by the client (selectable by tabs at the top), monthly activity, a transaction list with spending by category, a cash flow chart, and links to other related actions. The account overview section 620 is shown here merely to illustrate how a client interacts with the online banking system on a regular basis, which makes the client a likely candidate to activate a deposit rate promotional offer using the online banking system.

Below the account overview section 620, the new deposit rate promotion campaign offer 630 appears in a "Your Offers" section of the online banking system. The client may arrive at the Your Offers section by clicking on a so-named button elsewhere in the online banking system, or by clicking on a notification of the deposit rate promotional offer which the client received. As mentioned earlier, when the bank employee implements a new promotional campaign, the deposit rate promotion system 400 will preferably send out notifications to clients-such as push notifications in app-based digital banking systems, and messages and/or emails for users of an online banking system as illustrated in FIG. 6.

In one embodiment, as shown here, the new deposit rate promotion campaign offer 630 announces that the client has been selected for an upgraded interest rate, and specifies the applicable interest rate and deposit type. A button 640 is provided to enable the client to conveniently activate the promotional offer. As explained earlier, this will cause the online banking system to interact with the deposit rate promotion system 400 via the live interface 450, and ultimately create a new money market account for the client in the account and deposit information system 478 via the adapters 460/462/464.

Other features may be provided in the new deposit rate promotion campaign offer 630, such as certain words being formed as hyperlinks (e.g., Money Market Account) which the client can follow to learn more information. The graphical display and design options are endless of course, but in all cases the client is provided with a quick and easy means of understanding and activating the promotional interest rate offer, without having to remember or copy/paste promo codes or the like.

The display screen 600 of FIG. 6 is depicted in a manner which generally corresponds with a computer monitor, where the computer is running a web browser application and the monitor has a large display area. That is, a lot of information can be displayed simultaneously, as shown in FIG. 6. It is to be understood that in other embodiments, a mobile app is configured to display the same type of information depicted in FIG. 6; however, because of the smaller screen area of mobile devices (especially smart phones), the data displays may be distributed across multiple pages of the app, where the user navigates the pages using tabs at the top and/or bottom of the screen, or other suitable techniques.

The display screen 600 of FIG. 6 is part of, or communicates with, a computer which corresponds with the computing device 104 of FIGS. 1 and 2. It is to be understood that the computer and display screen 600 of FIG. 6 communicate with a back-end server such as the computing system 206 of FIGS. 1 and 2, by way of communications channels such as WiFi and/or cellular communication networks as illustrated by the network 258 ("the cloud").

Figure 7:
FIG. 7 is a mock-up illustration of a display screen on a mobile device, illustrating a digital banking system application communication to the client where the new deposit rate promotion campaign offer is detailed, according to an embodiment of the present disclosure.

FIG. 7 is a mock-up illustration of a display screen 700 on a mobile device, illustrating a digital banking system application communication to the client where a new deposit rate promotion campaign offer 710 is detailed, according to an embodiment of the present disclosure. The offer is communicated in a manner similar to that depicted in FIG. 6, and a button 720 is provided for the client to click to activate the offer. FIG. 7 is provided merely to illustrate that a new deposit rate promotion campaign offer can be rolled out to, and activated by, a client using an app-based digital banking system (e.g., on a mobile phone) as well as the browser-based online banking system depicted in FIG. 6. The display screen 700 of FIG. 7 is part of a mobile device which corresponds with the mobile device 106 of FIGS. 1 and 2.

The communication of the new deposit rate promotion campaign offer 710 to the client and the activation of the offer by the client cause the interactions with the deposit rate promotion system 400 and other related systems as illustrated in FIG. 4 and discussed earlier.

Figure 8:
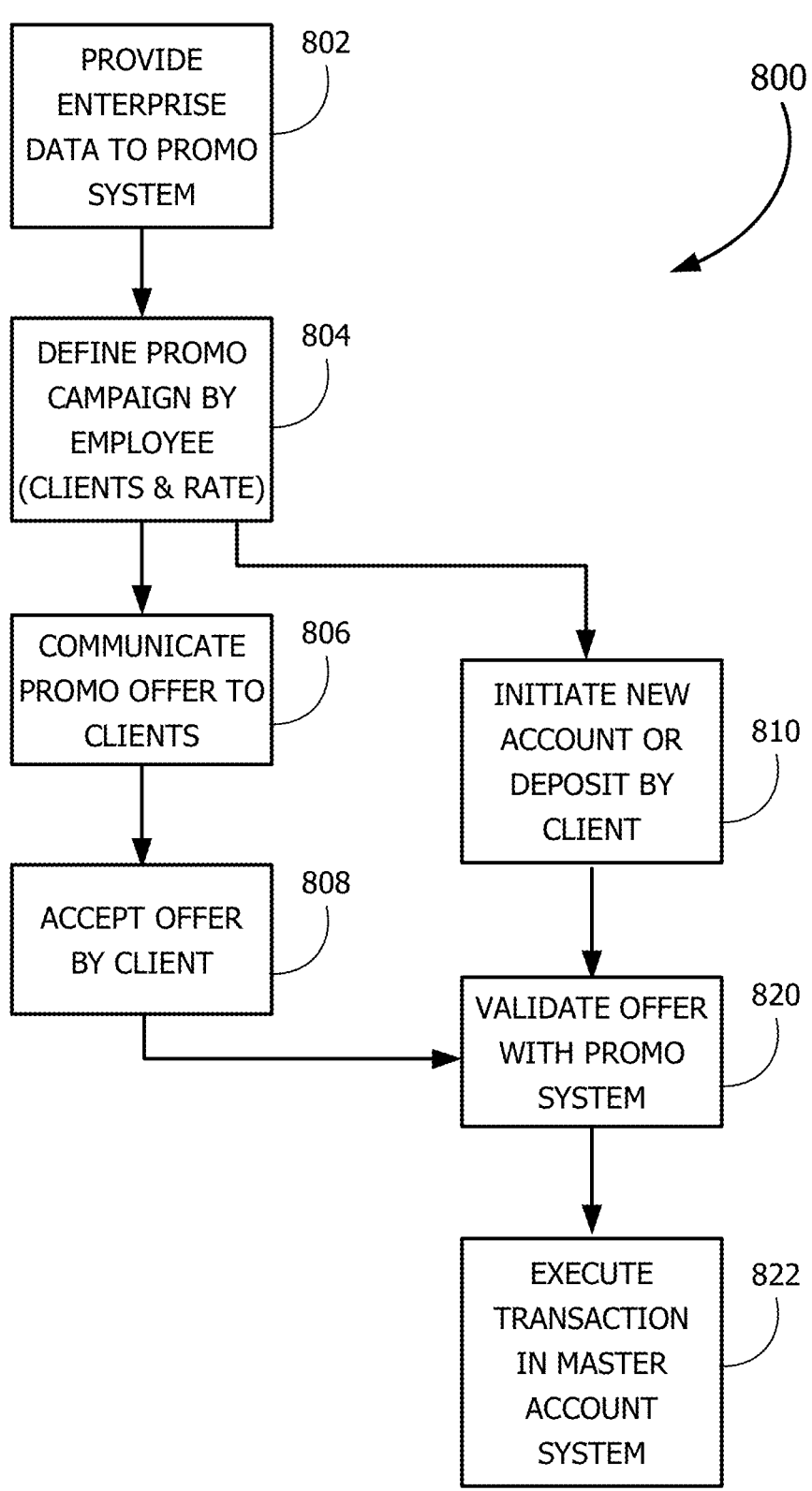
FIG. 8 is a flowchart diagram of a method for implementing a new deposit rate promotion campaign, including authorizing the promotion campaign by the bank employee and activating the offer by the client, along with corresponding data communications between bank systems, according to an embodiment of the present disclosure.

FIG. 8 is a flowchart diagram 800 of a method for implementing a new deposit rate promotion campaign, including authorizing the promotion campaign by the bank employee and activating the offer by the client, along with corresponding data communications between bank systems, according to an embodiment of the present disclosure. At box 802, data is provided from various enterprise data systems to the deposit rate promotion system 400. This includes the batch interface 480 from the several legacy systems 470 as illustrated in FIG. 4. At box 804, a deposit rate promotional campaign is defined by a bank employee. This includes identifying a batch or group of clients based on attributes such as those depicted in FIG. 5, and defining the other parameters of the promotional campaign such as the promotional interest rate and the type of deposit account or transaction to which it applies.

Once the promotional campaign is defined in the deposit rate promotion system 400, two different paths can be taken for any particular client to activate the promotional offer. At box 806, the promotional offer is communicated to the client. This could be, for example, as illustrated in FIG. 6 or 7 in an online or digital banking system. The communication could also be by email or take some other form. At box 808, the client takes an action to accept the offer. This could be by clicking the button depicted in FIG. 6 or 7 (and then identifying a source of funds for the deposit, etc.), or by visiting a branch office. At box 820, the promotional offer is validated with the deposit rate promotion system 400. This is done via the live interface 450 from either the online/ digital banking systems 430 or the branch office systems 440, and includes confirming that the client is eligible and that the deposit transaction meets the qualifications.

At box 822, the qualifying transaction (e.g., new money market account opened, or new funds deposited in existing account) is executed in the master client account system. This involves the online/digital banking systems 430 or the branch office systems 440 using the adapters 460/462/464 to execute the deposit transaction in the account and deposit information system 476.

In another scenario (the right branch of the flowchart diagram 800), a client who is eligible for the promotional offer simply decides to initiate the opening of a new account or make a deposit into an existing account at box 810. This could be done with or without the client being aware of the offer (i.e., the communication at the box 806 is possible but not necessary). Based on the client taking the qualifying deposit action at the box 810, the online/digital banking systems 430 or the branch office systems 440 will automatically determine that the client is eligible and the deposit transaction qualifies, via validation at the box 820. Upon validation, the deposit transaction will be executed at the box 822 as described above.

Throughout the preceding discussion, various computers and programs are described and implied. It is to be understood that the software applications and modules of these computers are executed on one or more computing devices having a processor and a memory module. In particular, this includes computer(s) with processor(s) configured with algorithms performing the functions of the blocks in FIG. 4, devices performing the user interface functions of FIGS. 5-7, etc. These computers and devices are represented by the elements 104, 106 and 206 of FIGS. 1-2, including the inter-connectivity needed to provide the functionality of the deposit rate promotion system of the present disclosure.

The deposit rate promotion system, discussed above, provides advantages to both clients and the financial institution which employs the system. Clients are provided with an opportunity to receive an elevated interest rate on qualifying savings, where activation of the promotional offer is simple and automatic. The financial institution not only gains the capability to manage promotional deposit savings campaigns, but to do so using a fast and flexible process. These benefits lead to increased client satisfaction and improved employee productivity, both of which are good for the financial institution.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A method for implementing a dynamic upgrade engine, said method comprising:

providing a source of data to a server computer having a processor and memory;

identifying parameters for upgraded access, by a first unit communicating with the server computer;

initiating an action to activate the upgraded access, by a second unit;

confirming the action initiated by the second unit qualifies for the upgraded access, by the server computer; and executing the action, where the first unit is an agent of a bank operating a first user device, and the second unit is an individual who initiates the action using a second user device, and where the data includes financial and account data for a plurality of clients of the bank including the individual, and the upgraded access is an increased interest rate on savings deposits, and where identifying parameters for upgraded access includes defining a type of savings deposits which qualifies for the increased interest rate, defining a pool of clients eligible for the increased interest rate based on eligibility criteria, and specifying a level of the increased interest rate, where the eligibility criteria include clients' company of employment, clients' length of relationship with the bank, a number of accounts per client, a total amount of deposits per client, historical savings patterns per client, recent or expected life events per client, relationships between client, and factors determined from client demographics, and where the clients meeting the eligibility requirements are computed using a machine learning system including a neural network which forms nodal and layer connections based on the data and the eligibility criteria selected by the employee, and where the neural network is initially trained using an unsupervised learning process, and the neural network is subsequently trained using a supervised learning update training process with classified client data defining effectiveness of previous increased interest rate campaigns in relation to the eligibility criteria, where the data, evaluated by the machine learning system in comparison to the eligibility criteria, is provided to the server computer from a plurality of existing bank data systems using tailored adapters, a batch interface and a live interface, wherein the batch interface provides data connectivity from existing back-office bank data systems to the server computer, the live interface connects existing customer-facing bank data systems to the server computer, and the tailored adapters connecting both online and branch-office systems of the customer-facing bank data systems with the back-office bank data systems, where the machine learning system computes the clients meeting the eligibility criteria using the neural network as trained in the supervised learning update training process, and a number of the clients meeting the eligibility criteria computed by the machine learning system is displayed on a user interface where the agent of the bank iteratively modifies the eligibility criteria and evaluates a new number of the clients meeting the eligibility criteria computed in real time by the machine learning system until the number of clients is within a target range, whereupon the agent of the bank implements the upgraded access, notifications are sent to the clients meeting the eligibility criteria informing the clients that they are eligible for the upgraded access, and the individual then initiates the action to activate the upgraded access, and where the live interface is used to communicate the upgraded access from the server computer to the customer-facing bank data systems, and after the individual activates the upgraded access using the customer-facing bank data systems, and the tailored adapters execute the upgraded access as a transaction in a new or existing account in the back-office bank data systems.

2. The method according to claim 1 wherein the user devices include tablet devices and smart phones configured with a mobile application which communicates with the server computer, and personal computing devices configured with a web browser application which communicates with the server computer.

3. The method according to claim 1 wherein initiating an action to activate the upgraded access includes making a savings deposit which qualifies for the increased interest rate, by an eligible client, either using an the online or digital banking system on the second user device or by visiting a branch office of the bank where a branch employee used a uses the branch office system to make the savings deposit.

4. The method according to claim 3 wherein confirming the action initiated by the second unit qualifies for the upgraded access includes accessing the server computer, by the online or digital banking system or the branch office system, and confirming client eligibility and qualification of the savings deposit based on the parameters defined by the employee of the bank.

5. The method according to claim 4 wherein executing the action includes accessing a bank system which manages the financial and account data for the plurality of clients of the bank, by the online or digital banking system or the branch office system, and making the savings deposit at the increased interest rate.

6. A deposit pricing rewards system, said system comprising:

a server computer having at least one processor and memory, where the server computer is in communication with a source of data via a first interface and in communication with customer-facing systems via a second interface, where the customer-facing systems include online and digital banking systems used by a client on a second user device, and the server computer is configured for;

reading and storing the data from the source via the first interface, where the data includes financial and account data for a plurality of clients of a bank;

receiving parameters defining a promotion for increased interest rate on savings deposits, provided by an employee of the bank using a first user device, where the parameters defining the promotion for increased interest rate include a type of savings deposit which qualifies for the increased interest rate, a pool of clients eligible for the increased interest rate based on eligibility criteria, and a level of the increased interest rate, and the eligibility criteria include a clients' company of employment, clients' length of relationship with the bank, a number of accounts per client, a total amount of deposits per client, historical savings patterns per client, recent or expected life events per client, relationships between client, and factors determined from client demographics;

receiving notification of a client action from one of the customer-facing systems via the second interface;

determining whether the client action is a savings deposit which qualifies for the increased interest rate based on the parameters of the promotion; and authorizing the increased interest rate to the customer-facing system when the client action qualifies based on the parameters of the promotion, where upon authorization of the increased interest rate by the server computer, the customer-facing system executes the savings deposit, including accessing a bank system which manages the financial and account data, and making the savings deposit at the increased interest rate, and where the clients meeting the eligibility requirements are computed using a machine learning system including a neural network which forms nodal and layer connections based on the data and the eligibility criteria selected by the employee, and where the neural network is initially trained using an unsupervised learning process, and the neural network is subsequently trained using a supervised learning update training process with classified client data defining effectiveness of previous increased interest rate campaigns in relation to the criteria, where the data, evaluated by the machine learning system in comparison to the eligibility criteria, is provided to the server computer from a plurality of existing bank data systems using tailored adapters, a batch interface and a live interface, wherein the batch interface provides data connectivity from existing back-office bank data systems to the server computer, the live interface connects existing customer-facing bank data systems to the server computer, and the tailored adapters connecting both online and branch-office systems of the customer-facing bank data systems with the back-office bank data systems, where authorizing the increased interest rate and making the savings deposit at the increased interest rate are performed based on the clients meeting the eligibility criteria computed by the machine learning system using the neural network as trained in the supervised learning update training process, and a number of the clients meeting the eligibility criteria computed by the machine learning system is displayed on a user interface where the employee iteratively modifies the eligibility criteria and evaluates a new number of the clients meeting the eligibility criteria computed in real time by the machine learning system until the number of clients is within a target range, whereupon an agent of the bank implements the upgraded access using a computing device associated with the agent, notifications are sent using the computing device associated with the agent to the client devices meeting the eligibility criteria informing the clients that they are eligible for the upgraded access, and an individual then initiates the action to activate the upgraded access using a computing device associated with the individual, and where the live interface is used to communicate the upgraded access from the server computer to the customer-facing bank data systems, and after the individual activates the upgraded access using the customer-facing bank data systems, and the tailored adapters execute the upgraded access as a transaction in a new or existing account in the back-office bank data systems.

7. The system according to claim 6 wherein the user devices include tablet devices and smart phones configured with a mobile application which communicates with the server computer, and personal computing devices configured with a web browser application which communicates with the server computer.

8. The system according to claim 6 wherein the parameters defining the promotion are provided by the employee using the first user device to access a user interface portal of the system running on the server computer.

9. The system according to claim 6 wherein the server computer is further configured for sending a communication to the pool of clients informing the pool of clients that they are eligible for the increased interest rate after the clients meeting the eligibility criteria are computed by the machine learning system.

\* \* \* \* \*